United States Patent
Abromitis et al.

(10) Patent No.: US 10,367,391 B2
(45) Date of Patent: Jul. 30, 2019

(54) GENERATOR STATOR BAR HAVING PROFILE STRIP AND PROCESS FOR MANUFACTURING GENERATOR STATOR BAR

(71) Applicant: Siemens Energy, Inc., Orlando, FL (US)

(72) Inventors: Erik Abromitis, Fort Mill, SC (US); Tristan Mills, Charlotte, NC (US); David Earl Hulsey, Fort Payne, AL (US); Stephen Freeman, Rainsville, AL (US)

(73) Assignee: SIEMENS ENERGY, INC., Orlando, FL (US)

( * ) Notice: Subject to any disclaimer, the term of this patent is extended or adjusted under 35 U.S.C. 154(b) by 327 days.

(21) Appl. No.: 15/457,121

(22) Filed: Mar. 13, 2017

(65) Prior Publication Data

US 2017/0338709 A1    Nov. 23, 2017

Related U.S. Application Data

(60) Provisional application No. 62/337,588, filed on May 17, 2016.

(51) Int. Cl.
*H02K 3/46* (2006.01)
*H02K 15/02* (2006.01)

(52) U.S. Cl.
CPC ............... *H02K 3/46* (2013.01); *H02K 15/02* (2013.01)

(58) Field of Classification Search
CPC ............ H02K 3/46; H02K 15/02; H02K 3/40; H02K 3/34; H02K 3/48; H02K 3/12; H02K 15/12; H02K 3/14; H02K 3/30; H02K 3/32; Y10T 29/49009; B32B 27/20; H01F 7/06; H01B 7/00
USPC ............................................ 310/43, 45, 196
See application file for complete search history.

(56) References Cited

U.S. PATENT DOCUMENTS

| 4,739,207 | A | 4/1988 | Ying et al. |
| 5,623,174 | A | 4/1997 | Markovitz et al. |
| 6,288,341 | B1 * | 9/2001 | Tsunoda ................. H02K 3/345 |
| 6,663,816 | B2 | 12/2003 | Younsi et al. |
| 7,893,357 | B2 * | 2/2011 | Williams ................. H02K 3/14 |
| | | | 174/116 |

(Continued)

FOREIGN PATENT DOCUMENTS

| JP | S51-49403 | 4/1976 |
| JP | S55-79664 A | 6/1980 |
| JP | 2012-23788 A | 2/2012 |

*Primary Examiner* — Julio C. Gonzalez
*Assistant Examiner* — Leda T Pham

(57) ABSTRACT

Generator stator bar having profile strip and process for manufacturing a generator stator bar are presented. The generator stator bar includes stator bar strands assembled together. The profile strip is placed on top side and bottom side surfaces of the stator bar strand assembly. The profile strip includes uncured strip consisting of uncured material. The profile strip includes pre-cured strip consisting of pre-cured material. The pre-cured strip includes cavities perforated through its thickness. The profile strip enables the generator stator bar to be manufactured by a single press and heat operation to achieve a rectangular geometry having round outer edges and to maintain orientations of stator bar strands parallel to the profile strip.

15 Claims, 3 Drawing Sheets

(56) References Cited

U.S. PATENT DOCUMENTS

| | | | |
|---|---|---|---|
| 8,872,405 B2* | 10/2014 | Emery | H02K 3/40 310/196 |
| 2004/0094325 A1* | 5/2004 | Yoshida | H02K 3/30 174/120 R |
| 2012/0030936 A1 | 2/2012 | Safari Zadeh | |

* cited by examiner

GENERATOR STATOR BAR HAVING PROFILE STRIP AND PROCESS FOR MANUFACTURING GENERATOR STATOR BAR

TECHNICAL FIELD

This invention relates generally to a generator stator bar having profile strip and process for manufacturing a generator stator bar.

DESCRIPTION OF RELATED ART

A generator is a component of a power plant that converts mechanical energy to electrical energy. Performance and cost of a generator may greatly influence the performance and cost of a power plant. Generator stator bars may be one of the major drivers for both the performance and cost of the generator.

A generator stator bar may be manufactured by Roebelling a plurality of stator bar strands together with consolidation material between stator bar strand columns under pressure and heat into a consolidated stator bar strand assembly. The consolidated stator bar strand assembly may then be enclosed by an insulation system. Orientations of the stator bar strands in the generator stator bar may affect performance and longevity of a generator stator bar. It is desired that the generator stator bar has a uniform rectangular cross section that may be rounded along outer edges to improve functional quality of the insulation system.

Profile strips having uncured material may be assembled to the top side and bottom side surfaces of the stator bar strand assembly before applying pressure and heat. The uncured material may be needed to ensure consolidation of the profile strip to the stator bar and fill any voids between the stator bar and the profile strip. However, the uncured material may become soft under the pressure and heat. The softened profile strips may not provide sufficient constraint of the stator bar strands during consolidation. The stator bar strands may tilt or rotate. This may result in a manufacturing defect of the generator stator bar. The defect may result in an increase in electrical loss and subsequent loss in performance during operation of a generator. Direct substitution of a pre-cured material in the profile strips may prevent the stator bar strands from tilting or rotation during consolidation. However, the pre-cured material may not provide sufficient bonding strength between the profile strips and the stator bar strands.

The problem may be addressed by manufacturing the generator stator bar in two separate press and heat operations. The first press and heat operation may omit heat sensitive material from the top side and bottom side surfaces of the stator bar strand assembly. The first press and heat operation may consolidate the stator bar strand assembly into a rectangular cross section profile. The second press and heat operation may apply uncured conformable material on the top side and bottom side surfaces of the rectangular cross section profile of the consolidated stator bar strand assembly. The uncured conformable material may form profile strips under the pressure and heat. Outer edges of the profile strips may be rounded along its length. The first press and heat operation may maintain desired orientations of the stator bar strands. The second press and heat operation may provide acceptable bonding strength between the profile strips and the stator bar strand assembly due to the nature of the uncured material. However, the two separate press and heat operations may add significant manufacturing cost and cycle time when manufacturing generator stator bars.

SUMMARY OF INVENTION

Briefly described, aspects of the present invention relate to a generator stator bar having profile strip and process for manufacturing a generator stator bar, in particular, in a high voltage generator stator.

According to an aspect, a generator stator bar is presented. The generator stator bar comprises a stator bar strand assembly comprising a plurality of stator bar strands assembled together. The generator stator bar comprises a profile strip placed on a top side surface and a bottom side surface of the stator bar strand assembly. The profile strip comprises an uncured strip comprising uncured material. The profile strip further comprises a pre-cured strip comprising pre-cured material. The pre-cured strip is enclosed by the uncured strip. The pre-cured strip comprises cavities perforated through a thickness of the pre-cured strip. The uncured material of the uncured strip melts and flows through the cavities of the pre-cured strips under pressure and heat during a consolidation of the stator bar strand assembly to bond the profile strip on the top side surface and the bottom side surface of the stator bar strand assembly. The pre-cured material of the pre-cured strip maintains rigidity under the pressure and heat during the consolidation of the stator bar strand assembly to keep orientations of the stator bar strands parallel to the profile strip.

According to an aspect, a process for manufacturing a generator stator bar is presented. The process comprises assembling a plurality of stator bar strands together to form a stator bar strand assembly. The process comprises placing a profile strip on a top side surface and a bottom side surface of the stator bar strand assembly to form a stator bar assembly. The process comprises consolidating the stator bar assembly by applying pressure and heat on the stator bar assembly. The profile strip comprises an uncured strip comprising uncured material. The profile strip further comprises a pre-cured strip comprising pre-cured material. The pre-cured strip is enclosed by the uncured strip. The pre-cured strip comprises cavities perforated through a thickness of the pre-cured strip. The uncured material of the uncured strip melts and flows through the cavities of the pre-cured strips under pressure and heat during a consolidation of the stator bar strand assembly to bond the profile strip on the top side surface and the bottom side surface of the stator bar strand assembly. The pre-cured material of the pre-cured strip maintains rigidity under the pressure and heat during the consolidation of the stator bar strand assembly to keep orientations of the stator bar strands parallel to the profile strip.

According to an aspect, a profile strip for a generator stator bar is presented. The generator stator bar comprises a stator bar strand assembly comprising a plurality of stator bar strands assembled together. The profile strip is placed on a top side surface and a bottom side surface of the stator bar strand assembly. The profile strip comprises an uncured strip comprising uncured material. The profile strip comprises a pre-cured strip comprising pre-cured material. The pre-cured strip is enclosed by the uncured strip. The pre-cured strip comprises cavities perforated through a thickness of the pre-cured strip. The uncured material of the uncured strip melts and flows through the cavities of the pre-cured strips under pressure and heat during a consolidation of the stator bar strand assembly to bond the profile strip on the top side surface and the bottom side surface of the stator bar strand assembly. The pre-cured material of the pre-cured strip maintains rigidity under the pressure and heat during the consolidation of the stator bar strand assembly to keep orientations of the stator bar strands parallel to the profile strip.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
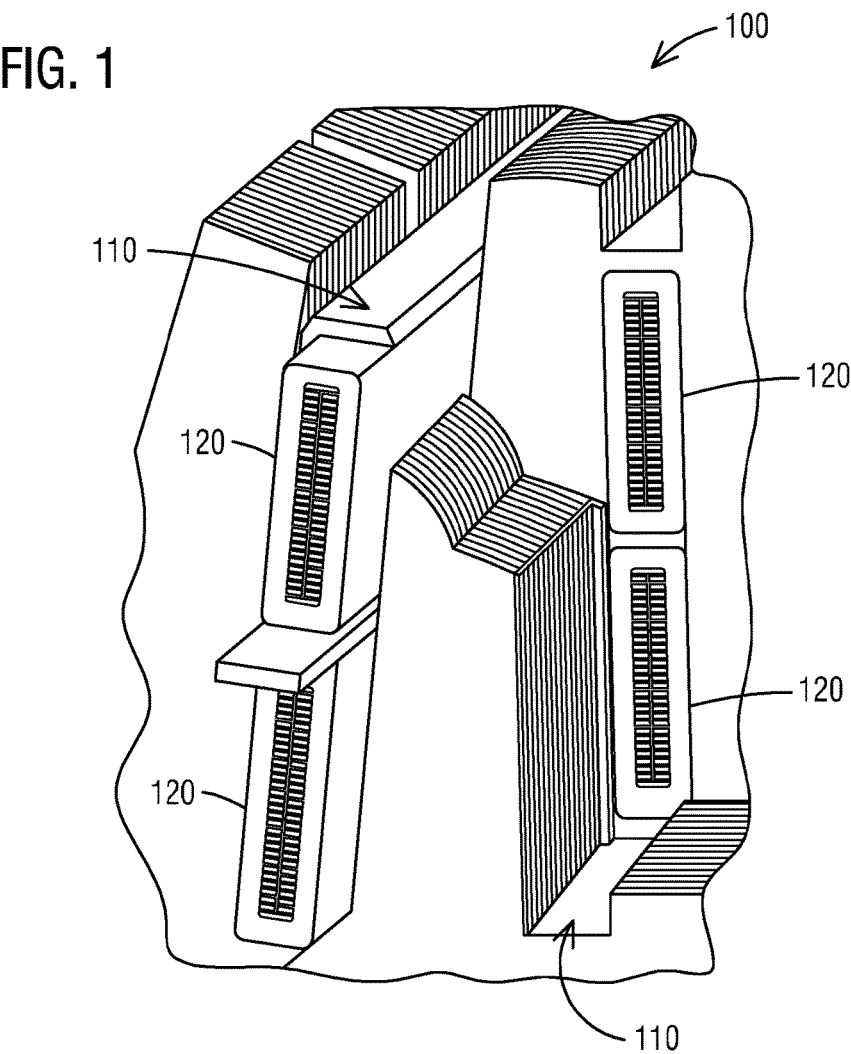
FIG. 1 illustrates a schematic isometric view of a generator stator according to an embodiment.

FIG. 1 illustrates a schematic isometric view of a generator stator 100 according to an embodiment. The generator stator 100 may include a plurality of slots 110 axially extending along a length of the generator stator 100. The generator stator 100 may include a plurality of stator bars 120. The stator bars 120 may be located in the slots 110 extending along length of the slots 110.

Figure 2:
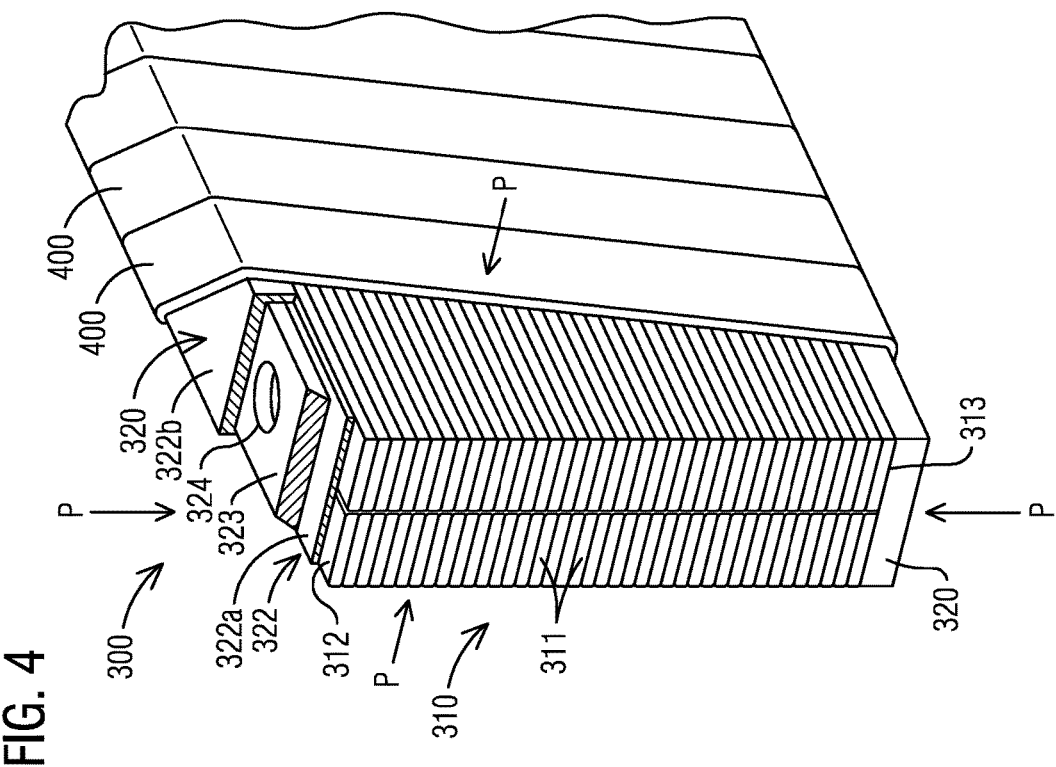
FIG. 2 illustrates a schematic isometric cut away view of a stator bar according to an embodiment.

FIG. 2 illustrates a schematic isometric cut away view of a stator bar 120 according to an embodiment. The stator bar 120 may include an insulation system 200. The insulation system 200 may have round edges 210 along its length. The insulation system 200 may enclose a stator bar assembly 300. The stator bar assembly 300 may include a stator bar strand assembly 310. The stator bar strand assembly 310 may include a plurality of stator bar strands 311. Each of the stator bar strands 311 may include a conductive strand that is insulated by an insulation layer. The conductive strand may be, for example, a copper strand. The plurality of stator bar strands 311 may be assembled together in at least one column, or a plurality of columns relative to each other. In the exemplary embodiment illustrated in FIG. 2, the stator bar strands 311 are assembled in two columns. The stator bar strand assembly 310 may have a rectangular cross section profile.

The stator bar assembly 300 may include profile strips 320. One profile strip 320 may be placed on a top side surface 312 of the stator bar strand assembly 310. Another profile strip 320 may be placed on a bottom side surface 313 of the stator bar strand assembly 310. The profile strips 320 may have round outer edges 321 along its length. Radius of the round outer edges 321 of the profile strip 320 may conform to radius of the round edges 210 of the insulation system 200 for increasing functional quality of the insulation system 200.

A cut away view of the profile strip 320 placed on the top side surface 312 of the stator bar strand assembly 310 is illustrated in FIG. 2. The profile strip 320 may include an uncured strip 322 consisting of uncured material. The uncured material may include nonconductive composite material. The uncured material may include nonmagnetic composite material. The uncured material may include moldable micanite material, such as muscovite mica paper with epoxy binder. The uncured strip 322 may include a first layer 322a and a second layer 322b. The profile strip 320 may include a pre-cured strip 323 consisting of pre-cured material. The pre-cured strip 323 may be enclosed by the uncured strip 322 between the first layer 322a and the second layer 322b. The pre-cured material may include nonconductive composite material having sufficient rigidity. The pre-cured material may include nonmagnetic composite material having sufficient rigidity. For example, the pre-cured material may include a glass fiber-epoxy laminate, such as, NEMA grade 11 glass fiber-epoxy laminate. Uncured material of the uncured strip 322 may become soft and melt when consolidating the stator bar assembly 300 under pressure and heat. The pre-cured strip 323 may include a plurality of cavities 324. The molten uncured material of the uncured strip 322 may flow through the cavities 324 of the pre-cured strip 323 to bond the profile strip 320 on the top side surface 312 of the stator bar assembly 300 during consolidation process. Pre-cured material of the pre-cured strip 323 may maintain rigidity during the consolidation process to keep orientations of the stator bar strands 311 parallel to the profile strip 320. Such orientations of the stator bar strands 311 may improve performance and longevity of a stator 100. The outer edges 321 of the profile strip 320 may be rounded along its length after cooling down from the consolidation process. Radius of the round edges 210 of the insulation system 200 may conform to radius of the round outer edges 321 of the profile strip 320. Such round outer edges 321 of the profile strip 320 may improve functional quality of the insulation system 200. The profile strip 320 placed on the bottom side surface 313 of the stator bar strand assembly 310 may have the same configuration, and is not described again herewith.

Figure 3:
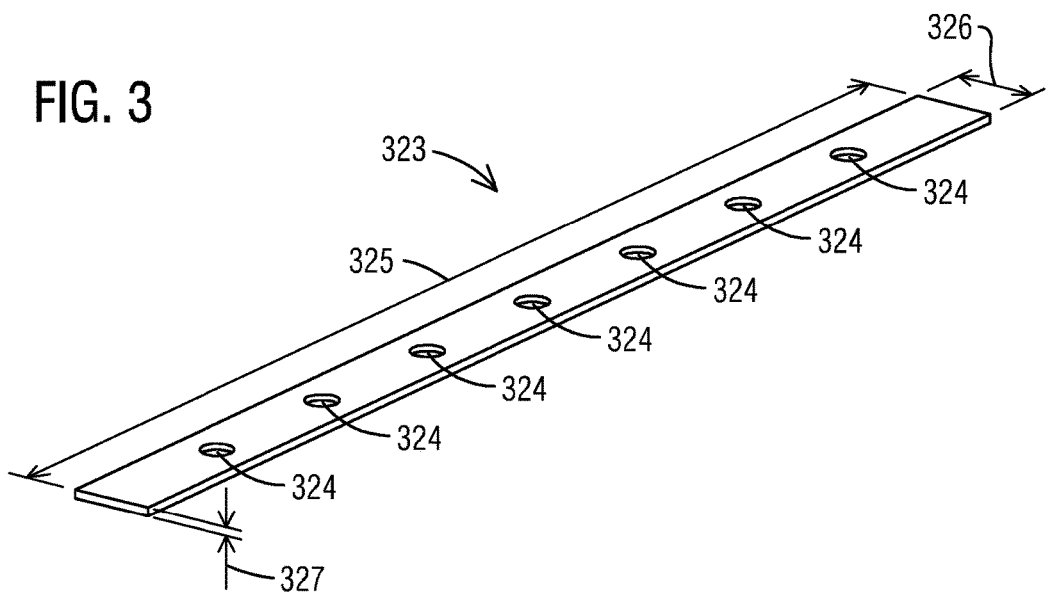
FIG. 3 illustrates a schematic isometric view of a pre-cured strip according to an embodiment.

FIG. 3 illustrated a schematic isometric view of a pre-cured strip 323 according to an embodiment. The pre-cured strip 323 may include a plurality of cavities 324. The cavities 324 may be perforated through a thickness 327 of the pre-cured strip 323. The cavities 324 may be regularly spaced apart along a length 325 of the pre-cured strip 323. The cavities 324 may be laterally centered along a width 326 of the pre-cured strip 323. The cavities 324 may be cylindrical holes. Dimensions of the pre-cured strip 323 and size of the cavities 324 may be designed based on a design of a stator bar assembly 300.

Figure 4:
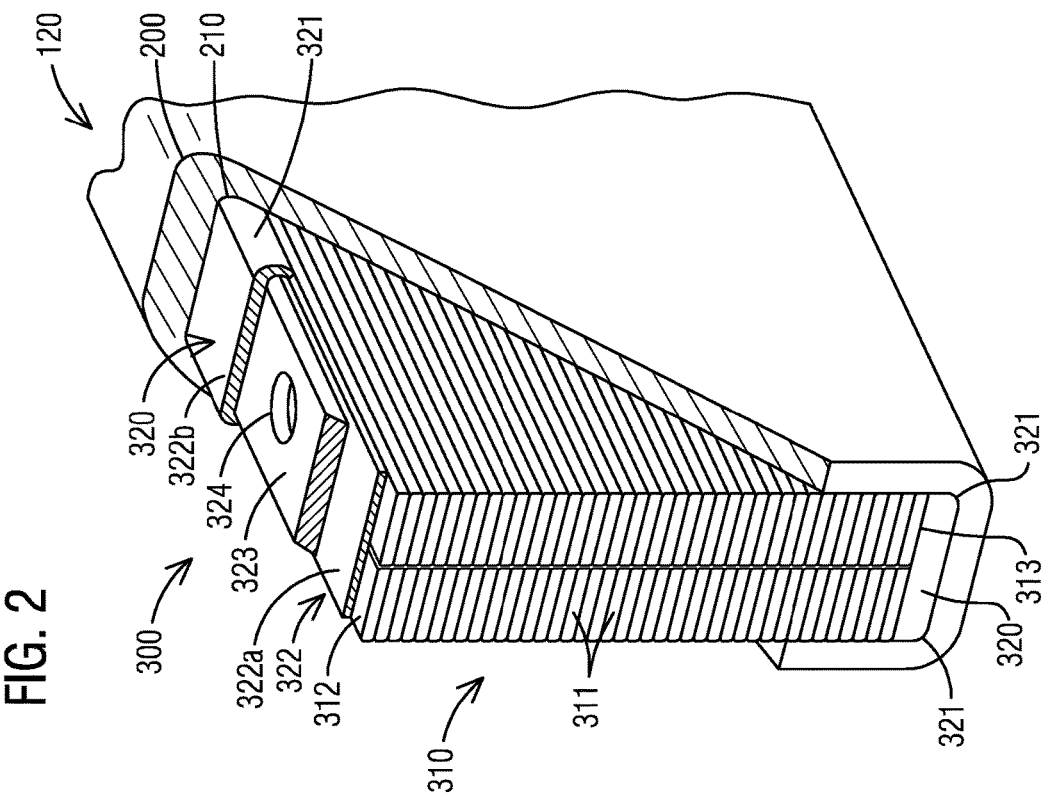
FIG. 4 illustrates a schematic diagram of a consolidation process for manufacturing a stator bar according to an embodiment.

FIG. 4 illustrates a schematic diagram of a process for manufacturing a generator stator bar 120 according to an embodiment. A plurality of stator bar strands 311 may be assembled together in at least one column to form a stator bar strand assembly 310. The stator bar strands 311 may be assembled together in a plurality of columns relative to each other. Profile strips 320 may be placed on a top side surface 312 and a bottom side surface of the stator bar strand assembly 310. The profile strips 320 and the stator bar strand assembly 310 may form a stator bar assembly 300. Orientations of the stator bar strands 311 may be assembled parallel to the profile strips 320.

A cut away view of the profile strip 320 placed on the top side surface 312 of the stator bar strand assembly 310 is illustrated in FIG. 4. The profile strip 320 may include an uncured strip 322. The uncured strip 322 may include a first layer 322a and a second layer 322b. The first layer 322a of the uncured strip 322 may be placed on the top side surface 312 of the stator bar strand assembly 310. The pre-cured strip 323 having perforated cavities 324 may be placed on a top of the first layer 322a of the uncured strip 322. The second layer 322b of the uncured strip 322 may be placed on a top of the pre-cured strip 323. The pre-cured strip 323 may be fully enclosed by the first layer 322a and the second layer 322b of the uncured strip 322. Same procedures may apply for placing the profile strip 320 on the bottom side surface 313 of the stator bar strand assembly 310, and are not described again herewith.

The stator bar assembly 300 may be held together by a layer 400. The layer 400 may be a sacrificial layer 400 having heat shrinkable sheet material, such as biaxially-oriented polyethylene terephthalate. The layer 400 may include Mylar™ tape. The layer 400 may hold the profile strips 320 and the stator bar strands 311 in the assembled positions before consolidation process. The stator bar assembly 300 may be consolidated by a single pressing and heating operation. Pressures may be applied to the stator bar assembly 300, such as in directions shown by arrows. Heat may be applied to the stator bar assembly 300 at the same time. Uncured material of the uncured strips 322 may become soft and melt during the consolidation process. The molten uncured materials of the uncured strips 322 may flow through the cavities of the pre-cured strips 323. The profile strips 320 may be bonded to the top side surface 312 and the bottom side surface 313 of the stator bar strand assembly 310 by the molten uncured material. Pre-cured material of the pre-cured strips 323 may maintain rigidity during the consolidation process to keep orientations of the stator bar strands 311 parallel to the profile strips 320.

The layer 400 may be removed from the stator bar assembly 300 after the consolidation process. Residue from the molten uncured material that may flow onto other side surfaces of the stator bar assembly 300 during the consolidation process may also be removed. The consolidated stator bar assembly 300 may be cooled down for a period of time.

Figure 5:
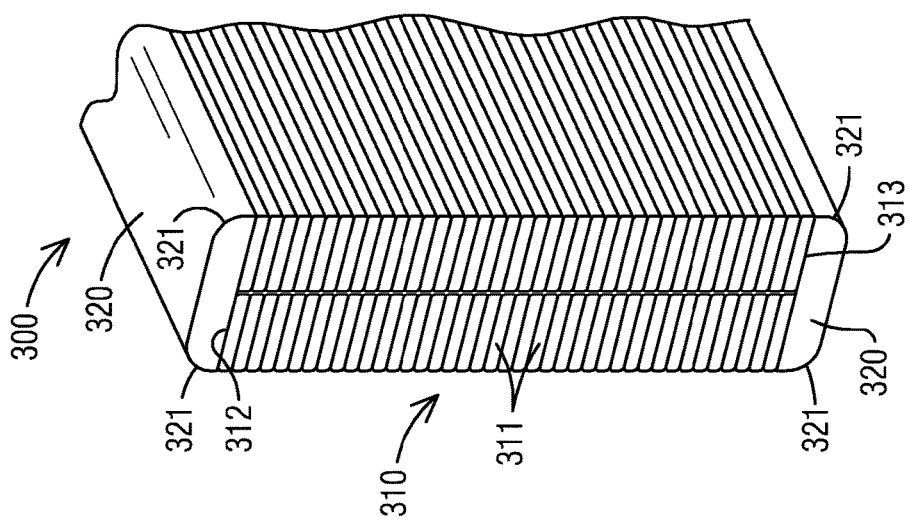
FIG. 5 illustrates a schematic isometric view of a finalized stator bar assembly according to an embodiment.

After the cooling period, outer edges of the profile strips 320 may be rounded along a length of the profile strips 320. FIG. 5 illustrates a schematic isometric view of a finalized stator bar assembly 300 according to an embodiment. The profile strips 320 may be bonded on the top side surface 312 and the bottom side surface 313 of the stator bar assembly 300. The profile strips 320 may have round outer edges 321. Radius of the round outer edges 321 may be defined to conform to radius of round edges 210 of the insulation system 200 for increasing the functional quality of the insulation system 200. The insulation system 200 may be applied to the finalized stator bar assembly 300.

Figure 6:
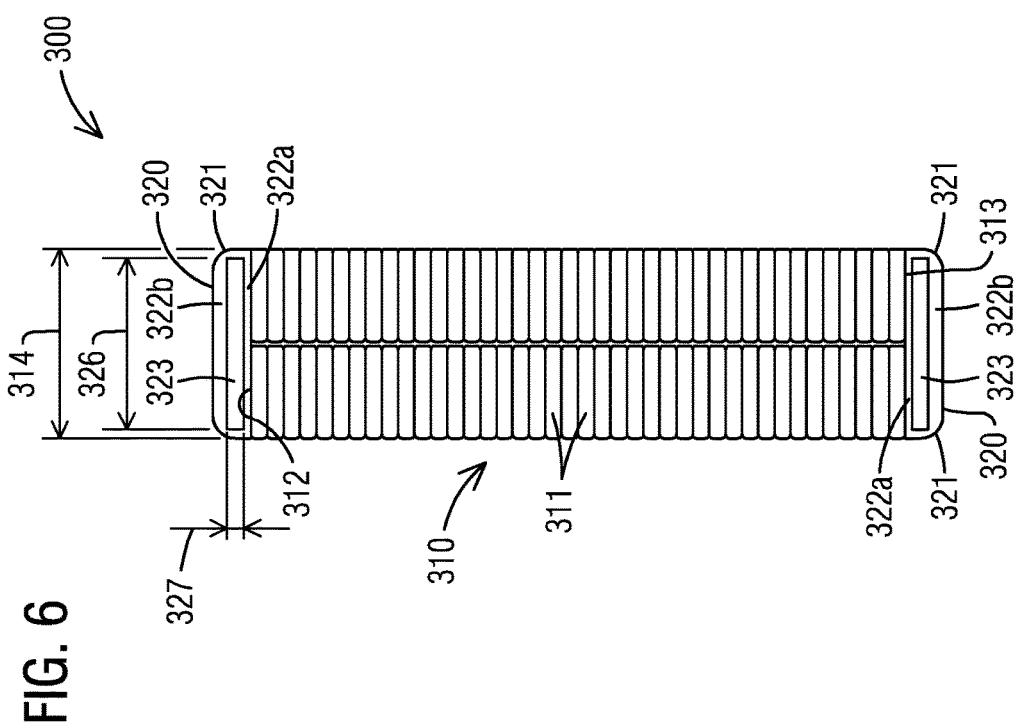
FIG. 6 illustrates a schematic cross section view of a finalized stator bar assembly according to an embodiment.

FIG. 6 illustrates a schematic cross section view of a finalized stator bar assembly 300 according to an embodiment. Profile strips 320 may be bonded on top side surface 312 and bottom side surface 313 of the stator bar assembly 300. The profile strips 320 may have round outer edges 321. Orientations of the stator bar strands 311 may be parallel to the profile strips 320 in the finalized stator bar assembly 300. Parallel orientation of the stator bar strands 311 to the profile strips 320 may improve performance and longevity of a generator. The profile strips 320 may include uncured strip 322 having a first layer 322a and a second layer 322b. The profile strips 320 may include a pre-cured strip 323 enclosed between the first layer 322a and the second layer 322b of the uncured strip 322. Width 326 of the pre-cured strips 323 may be defined in relation to width 314 of the consolidated stator strand assembly 310. For example, width 326 of the pre-cured strips 323 may be equal to or less than width 314 of the consolidated stator strand assembly 310. Width 326 of the pre-cured strips 323 may be equal to or no less than a range of width 314 of the consolidated stator strand assembly 310, for example, no less than 0.7 mm, or 0.5 mm, or 0.3 mm of width 314 of the consolidated stator strand assembly 310. Thickness 327 of the pre-cured strips 323 may be defined to provide a required radius of the round outer edges 321 of the profile strips 320. Thickness of the first uncured layer 322a and the second uncured layer 322b of the uncured strips 322 may be defined to prevent the stator bar strands 311 from rotation or tilting under pressure and heat.

According to an aspect, the proposed generator stator bar 120 may have geometry that may improve performance of a generator stator 100. The proposed generator stator bar 120 may be manufactured by a single press and heat operation. The single press and heat operation may significantly improve product throughput of the generator stator bar 120. The single press and heat operation may significantly reduce manufacturing cost and cycle time of the generator stator bar 120.

According to an aspect, the proposed profile strip 320 may include a pre-cured strip 323 having perforated cavities. The pre-cured strip 323 may maintain orientations of the stator bar strands 311 from rotation or titling under pressure and heat to reduce electrical loss during operation of a generator.

According to an aspect, the proposed profile strip 320 may include a thin layer of uncured strip 322. The thin layer of the uncured strip 322 may bond the profile strip 320 including the pre-cured strip 323 to the stator bar strand assembly 310. The uncured strip 322 may provide round outer edges 321 along a length of the profile strips 320 to increase functional quality of an insulation system 200.

According to an aspect, the proposed profile strip 320 may enable manufacturing a generator stator bar 120 having desired geometry by a single press and heat operation.

According to an aspect, the proposed profile strips 320 may be applied to a manufacturing process where two separate press and heat operations may be needed.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator Stator
110: Slot
120: Generator Stator Bar
200: Insulation System
210: Round Edge of Insulation System
300: Stator Bar Assembly
310: Stator Bar Strand Assembly
311: Stator Bar Strands
312: Top Side Surface of Stator Bar Strand Assembly
313: Bottom Side Surface of Stator Bar Strand Assembly
314: Width of Stator Bar Strand Assembly
320: Profile Strip
321: Round Outer Edge of Profile Strip
322: Uncured Strip
322a: First Layer of Uncured Strip
322b: Second Layer of Uncured Strip
323: Pre-cured Strip
324: Cavity
325: Length of Pre-cured Strip
326: Width of Pre-cured Strip
327: Thickness of Pre-cured Strip
400: Sacrificial Layer

What is claimed is:

1. A generator stator bar comprising:
a stator bar strand assembly comprising a plurality of stator bar strands assembled together; and
a profile strip placed on a top side surface and a bottom side surface of the stator bar strand assembly,
wherein the profile strip comprises an uncured strip comprising uncured material,
wherein the profile strip further comprises a pre-cured strip comprising pre-cured material,
wherein the pre-cured strip is enclosed by the uncured strip,
wherein the pre-cured strip comprises cavities perforated through a thickness of the pre-cured strip,
wherein the uncured material of the uncured strip melts and flows through the cavities of the pre-cured strip under pressure and heat during a consolidation of the stator bar strand assembly to bond the profile strip on the top side surface and the bottom side surface of the stator bar strand assembly, and
wherein the pre-cured material of the pre-cured strip maintains rigidity under the pressure and heat during the consolidation of the stator bar strand assembly to keep orientations of the stator bar strands parallel to the profile strip.

2. The generator stator bar as claimed in claim 1, wherein the cavities are regularly spaced apart along a length of the pre-cured strip.

3. The generator stator bar as claimed in claim 1, wherein the cavities are laterally centered along a width of the pre-cured strip.

4. The generator stator bar as claimed in claim 1, wherein the profile strip comprises round outer edges along a length of the profile strip.

5. The generator stator bar as claimed in claim 4, wherein the thickness of the pre-cured strip is defined based on radius of the round outer edges.

6. The generator stator bar as claimed in claim 1, wherein the uncured strip comprises a first layer and a second layer, and wherein the pre-cured strip is placed between the first layer and the second layer of the uncured strip.

7. A process for manufacturing a generator stator bar comprising:
assembling a plurality of stator bar strands together to form a stator bar strand assembly;
placing a profile strip on a top side surface and a bottom side surface of the stator bar strand assembly to form a stator bar assembly; and
consolidating the stator bar assembly by applying pressure and heat on the stator bar assembly,
wherein the profile strip comprises an uncured strip comprising uncured material,
wherein the profile strip further comprises a pre-cured strip comprising pre-cured material,
wherein the pre-cured strip is enclosed by the uncured strip,
wherein the pre-cured strip comprises cavities perforated through a thickness of the pre-cured strip,
wherein the uncured material of the uncured strip melts and flows through the cavities of the pre-cured strip under the pressure and heat during the consolidation to bond the profile strip on the top side surface and the bottom side surface of the stator bar strand assembly, and
wherein the pre-cured material of the pre-cured strip maintains rigidity under the pressure and heat during the consolidation to keep orientations of the stator bar strands parallel to the profile strip.

8. The process as claimed in claim 7, further comprising rounding outer edges of the profile strip along a length of the profile strip after a cooling down period.

9. The process as claimed in claim 7, wherein the uncured strip comprises a first layer and a second layer, and wherein the pre-cured strip is placed between the first layer and the second layer of the uncured strip.

10. A profile strip for a generator stator bar, wherein the generator stator bar comprises a stator bar strand assembly comprising a plurality of stator bar strands assembled together, wherein the profile strip is placed on a top side surface and a bottom side surface of the stator bar strand assembly, the profile strip comprising:
an uncured strip comprising uncured material; and
a pre-cured strip comprising pre-cured material,
wherein the pre-cured strip is enclosed by the uncured strip,
wherein the pre-cured strip comprises cavities perforated through a thickness of the pre-cured strip,
wherein the uncured material of the uncured strip melts and flows through the cavities of the pre-cured strip under pressure and heat during a consolidation of the stator bar strand assembly to bond the profile strip on the top side surface and the bottom side surface of the stator bar strand assembly, and
wherein the pre-cured material of the pre-cured strip maintains rigidity under the pressure and heat during the consolidation of the stator bar strand assembly to keep orientations of the stator bar strands parallel to the profile strip.

11. The profile strip as claimed in claim 10, wherein the cavities are regularly spaced apart along a length of the pre-cured strip.

12. The profile strip as claimed in claim 10, wherein the cavities are laterally centered along a width of the pre-cured strip.

13. The profile strip as claimed in claim 10, wherein the profile strip comprises round outer edges along a length of the profile strip.

14. The profile strip as claimed in claim 13, wherein the thickness of the pre-cured strip is defined based on radius of the round outer edges.

15. The profile strip as claimed in claim 10, wherein the uncured strip comprises a first layer and a second layer, and wherein the pre-cured strip is placed between the first layer and the second layer of the uncured strip.

* * * * *